United States Patent [19]
Fussell, Jr.

[11] 4,069,708
[45] Jan. 24, 1978

[54] FLOWMETER PLATE AND SENSING APPARATUS

[75] Inventor: Theodore John Fussell, Jr., Bridgewater Township, Somerset County, N.J.

[73] Assignee: Neptune Eastech, Inc., Edison, N.J.

[21] Appl. No.: 631,048

[22] Filed: Nov. 12, 1975

[51] Int. Cl.² ............................................. G01F 1/32
[52] U.S. Cl. .............................................. 73/194 VS
[58] Field of Search ................................... 73/194 VS

[56] References Cited
U.S. PATENT DOCUMENTS

| | | | |
|---|---|---|---|
| 1,935,445 | 11/1933 | Heinz | 73/194 |
| 2,813,424 | 11/1957 | Liepmann | 73/194 |
| 3,116,639 | 1/1964 | Bird | 73/194 |
| 3,564,915 | 2/1971 | Tomota et al. | 73/194 |
| 3,572,117 | 3/1971 | Rodley | 73/194 |
| 3,698,245 | 10/1972 | McNabb | 73/194 |
| 3,972,232 | 8/1976 | Miller et al. | 73/194 |
| 3,979,954 | 9/1976 | Ide et al. | 73/194 |

OTHER PUBLICATIONS

Michiyoshi et al., "Measurement of Flowrate Using Temp. Fluctuation Caused by Vortex Streets" in J. of Nuclear Sci. & Tech., 10/70, pp. 511-517.

*Primary Examiner*—Herbert Goldstein
*Attorney, Agent, or Firm*—Frederick W. Padden

[57] ABSTRACT

A bluff body flowmeter for a pipeline is disclosed with a plate mounted within the pipe and downstream of a vortex generating body for maintaining fluid vortex streets separated to facilitate their detection and translation into indications of flowrate through the pipe. The plate is mounted downstream of the vortex generating body at a prescribed distance which defines the vortex sensing site. A plurality of plate and sensing embodiments is disclosed. In one configuration, the plate is a flat rectangular plate spanning the entire inner diameter of the pipe and has its ends rigidly secured to the inner pipe wall. The plate comprises upper and lower surfaces having a downstream length for enabling fluid vortex signals to occur alternately about the environment of each such surface. The upper and lower plate surfaces flex, or move within a midsection between its fixed ends and that flexing causes vortex signal changes which are detected by a sensor. Other embodiments including cylindrical rods affixed to upper and lower plate surfaces; a free-to-move, rather than both fixed, plate ends; ferromagnetic spheres and movement confining block cavities; as well as, central and shuttle sensor-plate configurations which do not require flexure of the plate for flowmetering are also disclosed. A capacitance plate arrangement is also disclosed.

30 Claims, 19 Drawing Figures

FLOWMETER PLATE AND SENSING APPARATUS

BACKGROUND OF THE INVENTION

This invention relates to fluid mechanical apparatus for separating and sensing vortex shedding fluid signals in a conduit.

Vortex shedding is a natural phenomenon which can occur when a fluid is made to flow past a bluff or nonstreamlined body. A commonly cited example is the flow around a circular cylinder whose axis is perpendicular to the flowstream. In general, the flow does not follow the shape of the cylinder on the downstream side but separates from the cylinder surface and causes eddies to form. Such eddies or vortices grow in size until they become too large to remain attached to the cylinder. They then break away and are shed downstream at a frequency determined by the flowrate. The growth-shed cycle occurs alternately on either side of the cylinder in a periodic fashion, so that the downstream flow pattern is a staggered arrangement of trails of vortices, often referred to as the Karman vortex street. The direct relationship between shedding frequency and flow velocity makes the phenomenon of vortex shedding pertinent to flowmetering. A simple count of vortices shed is all that is required to establish total flow.

In the past, substantial innovative efforts have been devoted to the development of apparatus for conditioning fluid flow and vortex shedding signals to facilitate their detection and accurately indicating flowrate through a conduit. Among the U.S. Patents disclosing such flow conditioning and vortex sensing facilities are: W. G. Bird, U.S. Pat. Nos. 3,116,639 of Jan. 7, 1964; M. Tomota - H. Yamasaki - Y. Kurita 3,564,915 of Feb. 23, 1971; A. E. Rodely 3,572,117 of Mar. 23, 1971; C. L. McMurtrie—A. E. Rodely 3,587,312 of June 28, 1971; and T. J. Fussell, Jr. 3,732,731 of May 15, 1973 and 3,796,095 of Mar. 12, 1974.

Despite the teachings of the prior art, it has remained a problem reliably to sense vortex shedding signals downstream of a bluff body in a conduit and then accurately to portray a wide range of flowrates through the conduit based on the sensed signals. Reliable sensing has customarily been difficult because the vortex shedding streets often wander and commingle over flowrate ranges of interest. As a consequence, flow signal distortion and cancellation occur and the sensed signals are translated into inaccurate portrayals of flowrate through the conduit.

In view of the foregoing, there has been a need in the prior art for a means for militating against impaired vortex shedding flow signals and errors caused by sensing nonsegregated commingled vortex flow signals downstream of a vortex shedding body.

SUMMARY OF THE INVENTION

The foregoing problem is solved and need satisfied in accordance with an illustrative embodiment of my invention in which fluid mechanical apparatus is mounted within a conduit downstream of a bluff body for maintaining vortex streets separated to enhance flow signal detection. A preferred exemplary bluff body comprises a generally triangular-shaped bluff body according to teachings of the aforementioned Rodely U.S. Pat. No. 3,572,117. Such a bluff body comprises a base surface facing upstream and downstream surfaces joining the base surface at sharp corner edges defining substantially fixed flow separation points. The base surface has a height dimension ($h$). Each of the embodiments of my invention illustratively utilize the Rodely body.

One exemplary embodiment comprises a thin flat rectangular plate which spans the entire inner diameter of a pipeline conduit. A frontmost edge of the plate is located at a distance equal to approximately two to three times the height dimension of the Rodely bluff body base surface. I have discovered that mounting the plate any closer than $2h$ tends to impair the quality of the fluid flow signal to be detected and the freedom of that signal from intermittency. The distance further downstream than 2 to 3 $h$ depends on the practicability of the vortex streets remaining separated before they interact with the plate. Also, the strength of the vortex signals decreases with increasing distance downstream of the bluff body.

Advantageously, the flat plate is mounted in a same plane as the long (streamwise) plane of the bluff body and substantially normal to the bluff body base surface. The thin dimension of the plate lies in a plane substantially parallel to the direction of flow downstream through the conduit. The plate illustratively comprises flat upper and lower surfaces extending from the frontmost edge to a downstream terminus of the plate. The downsteam length of those surfaces is designed to enable a vortex signal to occur one at a time on either the upper or lower side of the plate. If separated vortex signals occur concurrently on opposite upper and lower surfaces of the plate, they tend to impair signal detection. A streamwise length of the plate is optiminally found to be equal to between 0.5 and 3 bluff body base heights for pressure, thermal and electromagnetic sensor configurations.

In addition to the plate providing a site within a section of pipeline for the detection of enhanced and separated vortex signals, I have discovered that the dimensional thickness of the plate is also a factor in sensing those signals. For example, the thickness is selectively small enough so that the upper and lower surfaces of the plate are movable, or flex, in directions arcuately normal to the fluid flow downstream and in response to pressure differentials produced on those surfaces by vortex signals. Such movement is detectable in accordance with my teaching by one or more motion sensitive sensors mounted proximate to the plate. Illustratively, a ferromagnetic sensor is suitable for use with such movable plate configurations and the movable plate surfaces are either wholly or partially of a ferromagnetic material.

On the other hand, plate thickness is selectively large enough so that the upper and lower plate surfaces are essentiallly fixed, rigid and nonmovable for flow signal detection. In such a design, the plate functions essentially to separate and enhance vortex street signals for sensing by a pressure, thermal or ferromagnetic transducer configuration.

The dimensional thickness of the plate for the nonmovable and movable arrangements is determined by the fluid and environment of the pipeline as well as the sensor sensitivity. The plate is constructable wholly or partially of plastic, elastomerics, metals compatible with the fluids measured and sensors utilized.

According to a feature of my invention, the plate is rigidly securable at its opposite ends to an inner wall of the pipeline so that movement of the upper and lower plate surfaces is controllably at a central portion of those surfaces and is related to the flowrate through the pipeline. A sensor, such as a motion sensing transducer, is accordingly mounted proximate to the movable central portion of the plate for producing output signals related to the flowrate.

A feature of my plate structure for use with an electromagnetic sensor is that a ferromagnetic material is attached to a flexible nonmagnetic material which is, in turn, movably secured to at least one surface (upper or lower) of the plate. The ferromagnetic and nonmagnetic materials are deflectably moved in response to vortex induced changes in the fluid flow downstream past the plate and such movement alters a field generated by the electromagnetic sensor for producing output signals related to flowrate.

Another embodiment of my invention is that the plate is rigidly secured only at one of its ends to the inner wall of the pipeline and another end of the plate is free to move in directions arcuately perpendicular to the direction of fluid flow. Such movement is detectable by a suitable motion sensitive transducer. In an electromagnetic sensor arrangement, for example, the movable end of the plate includes a ferromagnetic material attached to a nonmagnetic material for causing changes in an electromagnetic field generated by the sensor in response to the vortex signal induced movement of the plate and ferromagnetic material. The sensor signals are then translated into flowrate indications.

It is a feature of my invention that the vortex street separation plate is slidably secured at its ends within slotted sections of a pair of blocks each of which is fastened to an opposite end of the inner pipe wall. This structural arrangement simplifies field service and replacement of the separation plate.

Another embodiment of the plate fastening arrangement is that the plate is slidably secured at its ends within slotted sections of the inner pipe wall without the need for the aforementioned blocks. The plate is also weldable or brazable to the pipe. This is the case with a clean-in-place sanitary meter where voids and dead spaces should not exist.

It is another aspect of my invention that a pair of rods are attached to upper and lower surfaces of the separation plate and communicate flow signals to a pair of sensors mounted through the pipe wall for detecting and translating those flow signals into indications of flowrate through the pipeline. Such a rod arrangement is suitably utilized with a separation plate which has both of its ends rigidly secured or clamped to or about opposite ends of the inner pipe wall. In the case of the clamped end plate, each of the rods is secured to the upper and lower plate surfaces midway between the plate ends. A cantilevered plate (one fixed and one free-to-move end) has the rods fixed near the free end. An electromagnetic sensor and ferromagnetic rod arrangement are suitable for such flowmeters.

In another embodiment, the separation plate is pivotally secured only at one of its ends by a hinge-means while the other plate end is free to move. An advantage of the hinged or pivoted plate is that it is more responsive than other of the disclosed plates to weak signals and thus increases the lower range limit of the meter. One feature of the hinge arrangement is that a pair of rods are secured to the upper and lower surfaces and move in arcuately perpendicular directions to the direction of flow downstream for producing signals which are related to flowrate and are sensed by one or more sensors in signal communication with the rod(s). Another feature of the hinged plate arrangement is that, instead of the pair of rods, a ferromagnetic material is secured to either or both of the upper and lower plate surfaces for perturbing, in response to its movement by vortex signals, an electromagnetic field generated by one or more electromagnetic sensors in proximity with the ferromagnetic material.

Another embodiment exemplary of my invention utilizes a flat separation plate with one of its ends secured to the inner pipe wall and with a ferromagnetic mass attached to its free-to-move end. The mass is movably confined within a cavity defined within a block secured to an adjacent segment of the inner pipe wall. An electromagnetic sensor illustratively is mounted through the pipe wall and into a bore of the secured block, but in nonfluid communication with the interior of the pipe, for sensing electromagnetic field changes produced by the movement of the ferromagnetic mass member. Such a field is generated, by way of example, by known techniques under control of the sensor. The sensed field changes are used for generating related flowrate indications. It is a further feature that the separation plate comprises a spring segment between its secured and free-to-move ends for obtaining increased sensitivity and less chance of fatigue failure.

Advantageously, a central sensor arrangement is incorporated in another version of the separation plate. The central sensor is illustratively a thermal sensor, such as a thermistor. It is mounted through the wall of the pipe and extends through a bore in the fixed plate into an aperture defined in a central section of the plate between its upper and lower surfaces. As a consequence, fluid flow signals admitted into the aperture from the upper and lower plate surfaces cause cooling of the thermal sensor for producing signals related to the flowrate through the pipeline conduit.

A shuttle sphere sensor arrangement is provided with a fixed end separation plate in accordance with another exemplary embodiment of my invention. It illustratively comprises a shuttleball unit integrated into the flat rectangular geometry of the fixed separation plate. The unit has a cylindrically shaped inner chamber extending illustratively in a direction normal to the direction of flow downstream. The unit has a first aperture extending from the upper plate surface into one end of the cylindrical chamber and a second aperture extending from the lower plate surface into a second opposite end of the chamber. Within the chamber is an exemplary hollow, low inertia, nickel sphere which moves back and forth within the chamber in response to fluid induced pressure signal changes communicated alternately into the chamber through the first and second apertures from the environment of the upper and lower plate surfaces. An electromagnetic sensor is illustratively mounted into nonfluid communication with the movement of the sphere for translating the vortex induced sphere movement into signals indicative of the flowrate through the pipe.

DRAWING DESCRIPTION

The foregoing and other features and advantages of my invention can be readily understood from the following more detailed description taken in conjunction with the accompanying drawing in which.

Although each of the drawing figures do not depict a bluff body, it is to be understood that each of the plate and sensor configurations shown in those figures are advantageously utilizable with a Rodely type bluff body.

DETAILED DESCRIPTION

Figure 1:
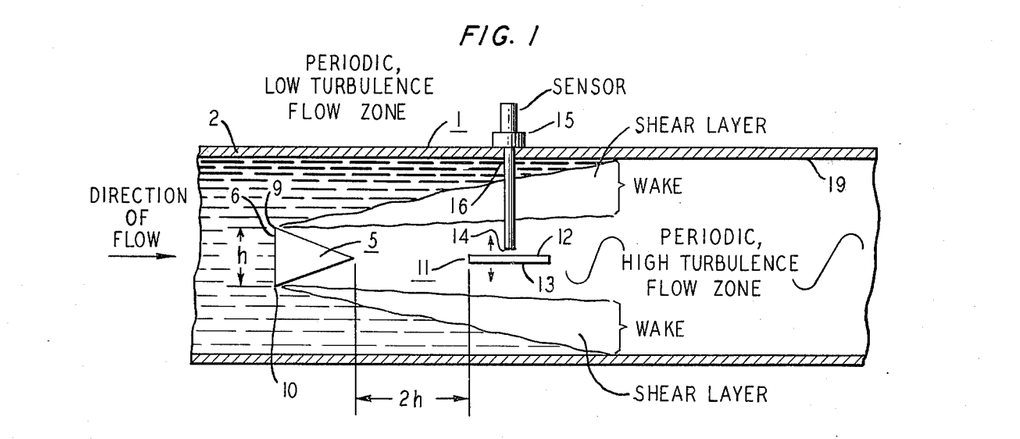
FIG. 1 shows schematically the fluid mechanical arrangement and flow zones created by a Rodely type bluff body utilizing my illustrative plate sensing structure in a pipeline conduit.

Before discussing my invention, it will be helpful to review the manner in which a bluff body interacts with fluid flowing in a conduit. As shown in FIG. 1, a bluff body 5 having an exemplary triangular cross section is mounted along a diameter of a pipe 1 and spans illustratively the entire diameter between the wall 2 of pipe 1. A facing surface or base 6 of body 5 faces upstream preferably normal to the direction of fluid flow. Body 5 comprises side members or downstream surfaces extending downstream from base surface 6 at sharp corner edges 9 and 10. These surfaces interact with fluid flowing in pipe 1 to produce an oscillating wake; i.e., that region bounded by and including the shear layers which separate the periodic, high turbulence flow zone behind body 5 from the periodic, low turbulence flow zone outside thereof. The wake zone commences proximate the sharp edged corners 9 and 10 of body 5 and spreads downstream from body 5 until it fills the entire pipe 1. In the upstream direction from body 5, the signals detectable in front of body 5 get progressively weaker upstream and become almost completely buried in the turbulent flow fluctuations at approximately one bluff body length upstream from body 5. A probe-like sensor 15 is mounted through a sealed opening 16 of the pipe wall 2.

To achieve nonintermittency in the oscillating fluid flow, it has been taught by Rodely that the ratio of the axial length of bluff body 5 to the height of base 6 is advantageously between 1 and 2, and the ratio of the height ($h$) of base 6 to the inner diameter of pipe 1 is advantageously between 0.15 and 0.4. Moreover, a dimensional length between a frontmost surface of the base 6 to its sharp corner edges 9 and 10 with respect to that of the height of the base is of a ratio of 0.3 or less. The foregoing flowmeter structure and criteria are utilized, by way of example, for the sensor configurations disclosed in FIGS. 1, 2A-2C, 3A-3F, 4, 5A-5B, 6A-6B, and 7A-7C.

In accordance with principles illustrative of my invention, FIG. 1 depicts an exemplary flat plate 11 mounted downstream from body 5 at a distance ($2h$) equal to twice the height ($h$) of base 6. Plate 11 comprises upper and lower surfaces 12 and 13 which selectively are constructed to deflect or flex in response to vortex signals produced by fluid flow downstream from body 5 and passed plate 11. Surfaces 12 and 13 are in the same plane as fluid flow downstream and illustratively in a plane coincident with a midpoint of the base surface ($h/2$). The thickness of plate 11 depends upon the fluid flow signal forces available to deflect its surfaces 12 and 13 and the amount of motion by those surfaces required for detection by sensor 15. Such thickness is to be different illustratively in air and water mediums. Sensor 15 is depicted with its lower extremity 14 in signal sensing communication with surface 12 for detecting deflections of that surface in response to the vortex signals produced by fluid flow downstream from body 5 and past plate 11. Of course, it is within the ambit of my invention, to construct plate 11 of such thickness that its upper and lower surfaces are rigid and essentially nonmovable. In such a case, the plate solely provides a site for separating and enhancing vortex signals for detection by suitable pressure, thermal or magnetic sensors.

Figure 2A:
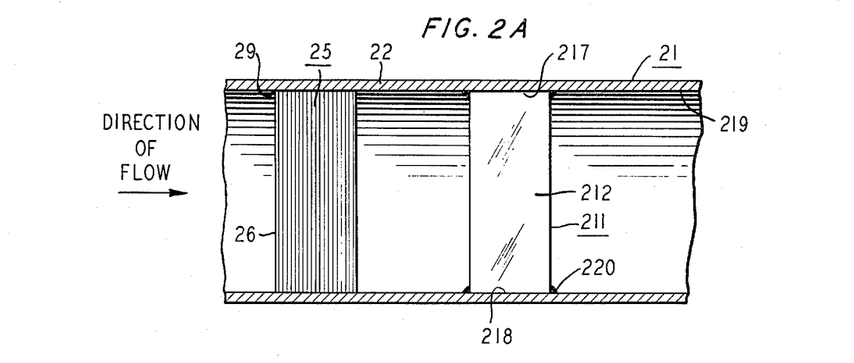
FIG. 2A is a plan view depicting a Rodely bluff body in association with a plate structure spanning the entire inner diameter of a pipe conduit with the opposite ends of that plate rigidly secured to the inner wall of the pipe.

FIG. 2A shows one embodiment of the plate structure of FIG. 1 in which a flat plate 211 spans the entire inner diameter of a pipe 21. Plate 211 is mounted downstream from bluff body 25 at a distance two times the height ($h$) of base 26. Plate 211 has its end segments 217 and 218 rigidly secured to the inner wall 22 by fastening means, such as welds 220. This configuration ensures that the ends 217 and 218 are substantially fixed and that deflecting movement of an upper plate surface 212 is selectively achievable about its midpoint between ends 217 and 218, and generally in directions arcuately normal to fluid flow downstream. An electromagnetically transducer or other known sensor (not shown in FIG. 2A) is mountable as depicted in FIG. 1 for detecting the movement.

Figure 2B:
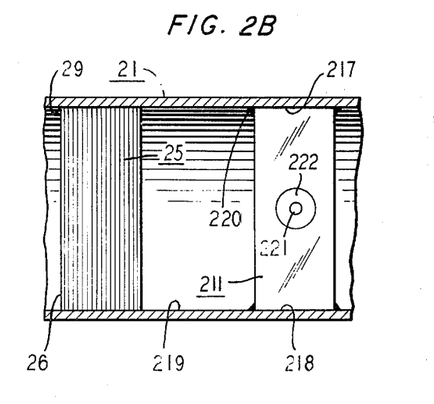
FIG. 2B shows the plate structure of FIG. 2A with a ferromagnetic sensing arrangement incorporated in a central section of the plate.

FIG. 2B is another arrangement of the plate structure of FIG. 2A for use with a magnetic sensor (not shown in FIG. 2B). In FIG. 2B, plate 211 comprises in its central section of its upper surface a ferromagnetic material 221 is attached to a flexible nonmagnetic material 222 which suitably comprises rubber, fabric diaphragm or other composition selectable according to the fluid medium. The magnetic and nonmagnetic materials 221 and 222 according to my teaching may be exposed on upper and lower surfaces of plate 211 and be deflectably moved in response to vortex induced changes in fluid flow downstream past plate 211. In such an arrangement, an electromagnetic sensor (not shown in FIG. 2B but mounted as demonstrated in FIG. 1) detects the movement of material 221 to provide output signals related to fluid flow rate through pipe 21.

Figure 2C:
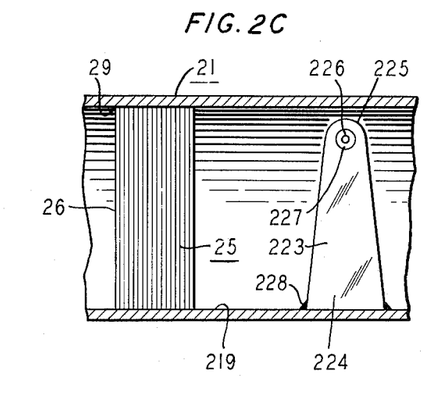
FIG. 2C illustrates another plate structure with one of its ends secured to the inner conduit wall and an opposite end embodying a ferromagnetic material being free for movement in response to vortex induced changes of a fluid flow downstream from a Rodely type bluff body.

In FIG. 2C, there is shown a plate 223 having only one of its ends 224 secured to the inner wall 219 by a fastening means 228. The other end 225 of plate 223 is advantageously free to move in directions generally normal to the fluid flow downstream and in response to vortex induced changes produced by that flow passed bluff body 25 and plate 223. FIG. 2C depicts plate 223 with a ferromagnetic material 226 secured to a nonmagnetic material (such as in FIG. 2B) and mounted illustratively on plate end 225 for deflecting movement in response to fluid flow signals. A suitable electromagnetic sensor (not shown in FIG. 2C) is mounted through the wall of pipe 21 for detecting movement of the ferromagnetic material 226.

Figures 3A, 3B, 3C, 3D, 3E, 3F:
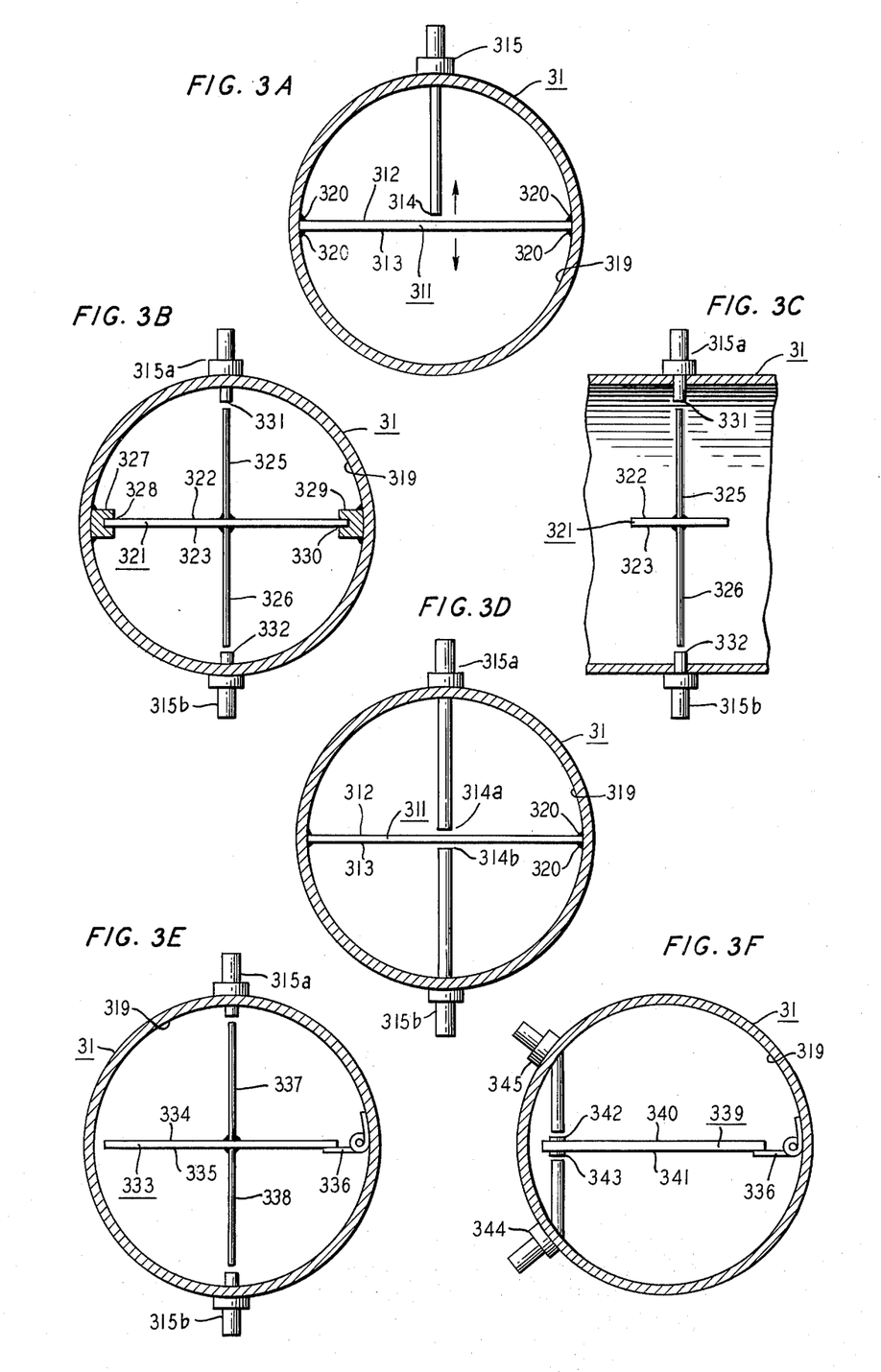
FIG. 3A shows a sensor configuration for the fixed plate arrangement of FIG. 2A and/or FIG. 2B.
FIG. 3B is a slidably removable plate structure secured at its ends to blocks fastened to the inner wall of a pipe and with rods extending from upper and lower surfaces of the plate for flow signal detection by a pair of sensors.
FIG. 3C is a side view of the plate, rod and sensor configuration of FIG. 3B.
FIG. 3D shows the plate structure of FIG. 2A with upper and lower sensors for detecting plate movement.
FIG. 3E depicts a hinged plate and rod arrangement with a pair of sensors.
FIG. 3F is another hinged configuration of a plate with a ferromagnetic material on its free end for flow signal detection by electromagnetic pickup sensors.

FIGS. 3A, 3B, and 3D-3F illustrate various plate structures and sensing arrangements. In all of those FIGS., the fluid flow through pipe 31 is into the paper and thereby gives a view from upstream at the bluff body (not shown) end of pipe 31 to the downstream end of pipe 31. In FIG. 3A, a flat plate 311 is shown with its opposite ends secured to the inner pipe wall 319 by fastener means, such as welds 320. Upper and lower end surfaces 312 and 313 are selectively movable at its midsection and generally upward and downward (and arcuately normal to flow through pipe 31) in response to vortex induced pressure signals produced by interaction of the fluid flow through pipe 31 with the bluff body (not shown). A sensor 315 illustratively is mounted through the wall 319 of pipe 31 for enabling its lower extremity to be in communication for detecting the flow signal changes.

FIG. 3D shows the plate structure of FIG. 3A with upper and lower sensors 315a and 315b extending through sealed openings in the wall 319 of pipe 31 for cooperatively detecting respective movement of the upper and lower surfaces 312 and 313 of plate 311.

FIG. 3B depicts a flat plate 321 which is removably secured at its ends by engagement with slotted cavities 328 and 329 in retaining blocks 327 and 329. The latter are fastened illustratively by welds to the inner wall 319 of pipe 31. Such an arrangement facilitates serviceability and tends to reduce outage time during maintenance and replacement. Upper and lower surfaces 322 and 323 have rods 325 and 326 advantageously secured thereto. The rods extend respectively upward and downward for communicating deflecting movements of surfaces 322 and 323 to sensors 315a and 315b.

FIG. 3C provides a side view of the plate, rod and sensor arrangement of FIG. 3B. It may be noted that the rods 325 and 326 are mounted on a centered mid portion of plate 321 between its rigidly secured ends.

FIGS. 3E and 3F illustrate flat plates 333 and 339 pivotally secured at one of their ends to respective hinges 336. The other end of each such plate is free to move in response to vortex induced changes produced by fluid flow through pipe 31. In FIG. 3E, rods 337 and 338 are fastened to upper and lower surfaces 334 and 335 of plate 333 for communicating upward and downward vortex flow signal induced movements of plate 333 to sensors 315a and 315b. FIG. 3F depicts ferromagnetic materials 342 and 343 secured to upper and lower surfaces 340 and 341 of plate 339. Movement of materials 342 and 343 by vortex flow signal induced movements of plate 339 are sensed by electromagnetic sensors 345 and 344 for translation into electrical signals related to fluid flow rate through pipe 31.

Figure 4:
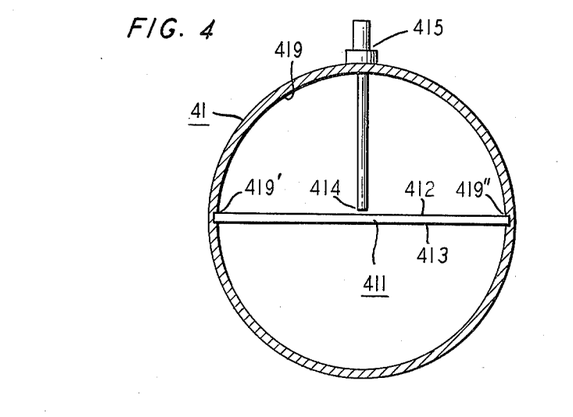
FIG. 4 shows a plate with its opposite ends removably secured within slotted portions of the inner wall of a pipe.

FIG. 4 shows a structural arrangement for facilitating field servicing and removal of a flowmeter plate 411 from the interior of a section of a pipeline conduit. The structure is similar to that disclosed in FIG. 3A. A difference is that the arrangement of FIG. 3A utilizes a fastening means such as welds 320 for securing the plate 311 at its ends. The FIG. 4 configuration, on the other hand, uses a pair of cavities 419' and 419'' for slidably and rigidly securing ends of the plate 411 within the interior wall 419 of pipe 41. Such cavities advantageously extend within the inner wall 419 of a bolted-in (and thus removable) section of the pipeline conduit which customarily contains the flowmeter components.

Figure 5A:
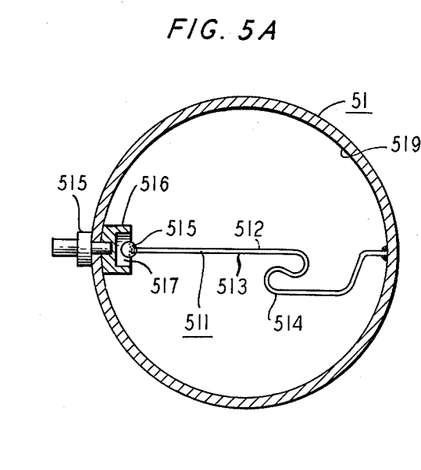
FIG. 5A illustrates a spring shaped configuration of the plate with an attached ferromagnetic mass which moves in a confining support member for detection by an electromagnetic sensor.

In FIG. 5A, a plate 511 is constructed with a spring segment 514 at one end which is rigidly secured (for example, by welds) to the inner wall 519 of pipe 51. Plate 511 illustratively has fastened at its free moving end a ferromagnetic ball member 515. The latter is movably confined within a slotted cavity 517 of a supporting block 516 which is also secured rigidly to inner wall 519. An electromagnetic pickup sensor 515 is, by way of example, inserted through the wall of pipe 51 and within a bore of block 516 for sensing movement of ball 515 as caused by deflections of plate 511 in response to vortex induced changes in fluid flow through pipe 51. The spring configuration is utilized advantageously to increase the sensitivity (extends the lower flowrate limit downwards) and minimal stresses (increased fatigue life).

Figure 5B:
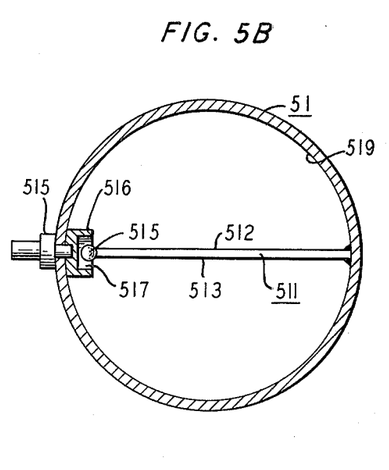
FIG. 5B is another version of the FIG. 5A structure without the spring configuration formed in the plate.

FIG. 5B is an arrangement similar in functional operation and construction to that of FIG. 5A except that plate 511 is formed with a flat straightened shape without the spring segment 514 of FIG. 5A.

Figure 6A:
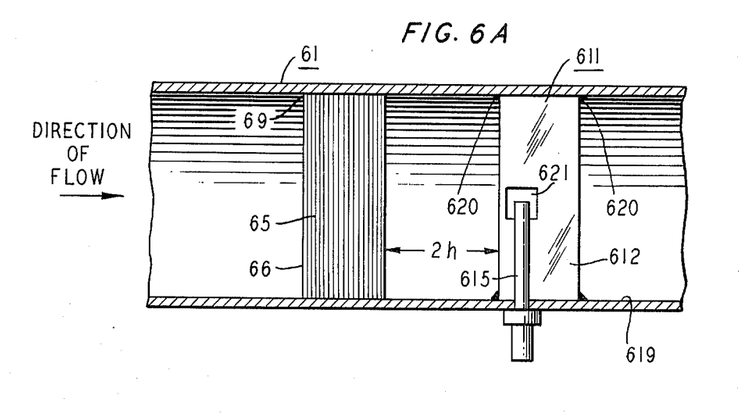
FIGS. 6A and 6B show plan and side views of a central sensor arrangement of the plate.
Figure 6B:
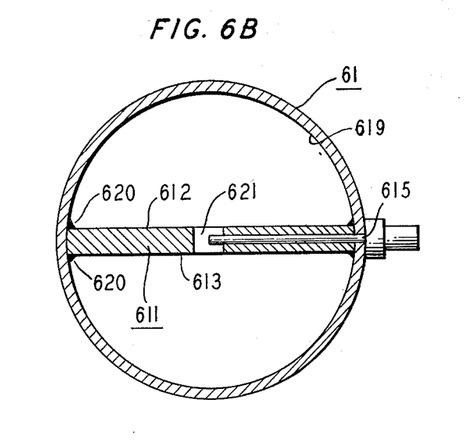

FIGS. 6A and 6B show a central sensor plate configuration in which interior walls of plate 611 define an aperture 621 extending between upper and lower surfaces 612 and 613 of plate 611. A sensor 615, such as one comprising an electrically heated thermistor is extended through a wall of pipe 61 and a bore in plate 611 for communicating with fluid signal changes through aperture 621. As shown in FIG. 6A, plate 611 is mounted within pipe 61 at a distance 2h downstream from a bluff body 65. The distance 2h is equal to twice the height dimension of the base surface 66 of body 65. Plate 611 is rigidly secured at its ends to the inner wall 619 illustratively by welds 620 and accordingly spans the entire inner diameter of wall 619. Body 65 illustratively is a Rodely shaped body and similarly spans the entire inner diameter of wall 619. Fluid flow within pipe 61 interacts with the base surface 66 of body 65 as well as its downstream surfaces and creates vortices which separate from sharp corner edges, such as edge 69 of FIG. 6A, of body 65. These fluid vortices flow downstream and are maintained in separation by plate 611. The separated fluid vortices create pressure differentials about plate 611. Such fluid flow also communicates through aperture 621 with sensor 615 and illustratively cools its thermistor to produce electrical signals related to the fluid flow rate through pipe 61.

Figure 7A:
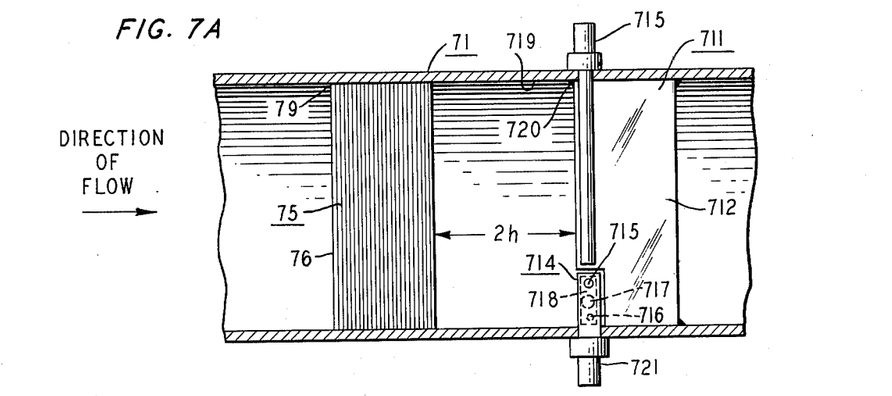
FIGS. 7A, 7B, and 7C depict structural features of a shuttleball, plate and sensor arrangement.

FIG. 7A discloses in a plan view a plate shuttleball arrangement of a flowmeter. It comprises a Rodely bluff body 75 with a base surface 76 and a flow separation edge 79 at the junction of surface 76 and downstream surfaces of body 75. At a distance two times the height (2h) of base surface 76 is located a plate 711 and its integrated shuttleball unit 714 and sensor arrangement.

Figure 7B:
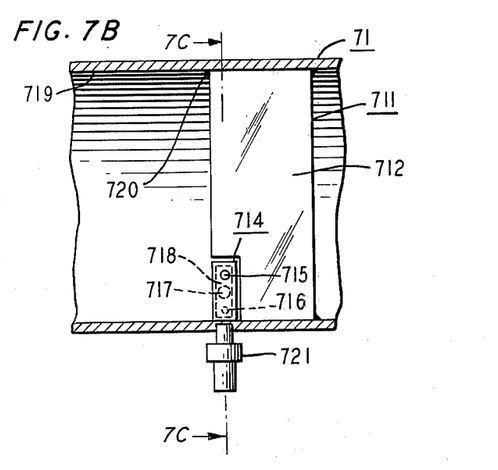
Figure 7C:
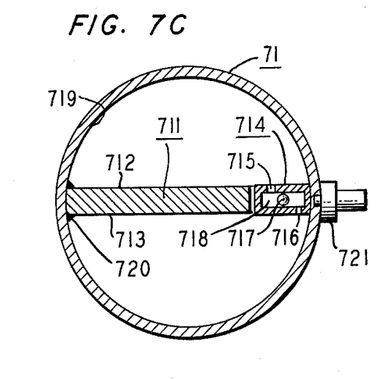

As shown in FIGS. 7A, 7B, and 7C, plate 711 has flat planar upper and lower surfaces 712 and 713 and is rigidly secured at its ends to the inner wall by fastener means 720. In the arrangement of FIG. 7A, plate 711 comprises a bore for admitting an electromagnetic sensor into communication for sensing movement of a shuttleball 717. Plate 711 also contains a cutout section for integrating a shuttleball unit 714 as part of the plate geometry for maintaining the separate vortex streets above and below plate surfaces 712 and 713. Thus, the illustrative geometry resultant from the plate 711 and shuttleball unit is essentially a unitary flat plate of rectangular shape spanning the entire inner diameter of wall 719 of pipe 71 for maintaining separate Karman vortex streets for signal detection.

The structural configuration of the shuttleball unit 714 is depicted in different views in FIGS. 7A, 7B, and 7C. These figures differ only insofar as the illustrative locations of the electromagnetic sensors. In FIG. 7A, such a sensor 715 extends through wall 719 of pipe 71 and a bore between surfaces 712 and 713 of plate 711 and into proximity for detecting movement of a ferromagnetic shuttleball 717 within a cavity 718 of unit 714. FIG. 7B depicts another arrangement in which a unit 721 comprises an electromagnetic sensor which partially extends into wall 719 so as to be in nonfluid communication with the interior of pipe 71 but into proximity with unit 714 for detecting movement of ferromagnetic shuttleball 717 within cavity 718.

Unit 714 illustratively comprises a cylindrically shaped cavity 718 and a pair of orifices 715 and 715 for communicating to cavity 718 fluid flow pressure signals generated respectively above and below plate surfaces 712 and 713 as shown in FIG. 7C. Cavity 718 contains a movable means 717 which illustratively is a hollow nickel sphere of low inertia which is free to move from side to side along the long axis of plate 711 at a distance approximately equal to one-tenth the diameter of the sphere. The electromagnetic sensor of FIGS. 7A and 7B generates a magnetic field in the region of the shuttleball 717 and its movement influences that field for detection by the sensor of the flow signals which then are translated into signals related to the flow rate through pipe 71.

In operation, the shuttleball 717 travels a relatively short distance within the channel 718 as the fluid pressures at orifices 715 and 716 change. The detected fluid flow signal amplitude is enhanced by the fact that the channel 718 is close to the electromagnetic sensor and because ball 717 oscillates directly away from and toward the sensor at a point of field line concentration. Moreover, the short travel and close tolerance of chamber 718 reduce undesired oscillations and undue wear of ball 717.

Figure 8:
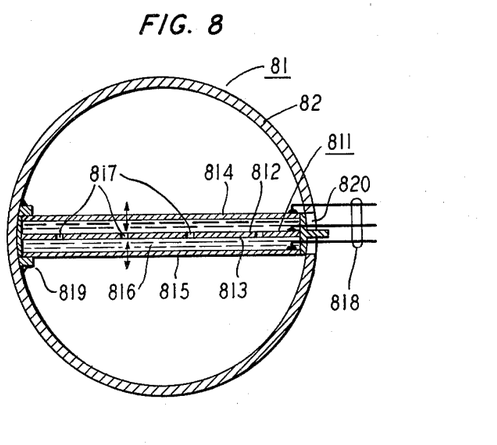
FIG. 8 shows a capacitor plate and fluid arrangement.

FIG. 8 discloses an electrical capacitor-plate unit in a section view. It is mounted within a holder 819 in a pipe 81. The unit is admitted into pipe 81 via its aperture 820. The streamwise length of the unit conforms to the 0.5 to 3h dimension and the unit is mounted downstream of a fluid vortex generating body as explained hereinbefore. The unit illustratively comprises a fluid 816 sealed within a pair of capacitor plates 814 and 815. A central plate 811 according to my teaching comprises upper and lower surfaces 812 and 813 and that plate is illustratively located midway between plates 814 and 815. A plurality of apertures 817 extend between surfaces 812 and 813 of plate 811 for enabling the sealed fluid freely to pass to and from the areas between surfaces 812 and plate 814 and surface 813 and plate 815. A cable having electrical conductors is also provided for attaching the capacitor plate arrangement to circuitry (not shown) which translates vortex fluid flow induced capacitance changes into indications of fluid flowrate through pipe 81. In operation, the capacitance changes are communicated to cable 18 when vortex fluid flow pressure signals flowing downstream cause plates 814 and 815 to flex in directions generally normal to the streamwise direction and to move the sealed fluid 816 through apertures 817.

It is to be understood that the hereinbefore described arrangements are illustrative of the application of principles of my invention. Illustratively, single and/or plural pressure, piezoelectric and strain gauge sensor arrangements are utilizable with various of my plate configurations with fixed ends and/or one fixed and one movable plate end. A strain gauge sensor, by way of example, is connectable to a free-to-move end of my plate teaching for sensing conditional vortex street signals related to flowrate. A strain gauge sensor is also connectable to one movable surface (upper, for example) of my fixed end plate configuration while another opposite surface (lower, for example) is maintained fixed and essentially nonmovable by suitable holder arrangements. It is also within the ambit of my invention to utilize a sensor arrangement which is external to the pipe conduit. Such an arrangement is desirable for field servicing with minimal flow shutdown. In such an arrangement, fluid flow pressure signals above and/or below a plate surface are communicated by one or more channelling devices to a housing comprising a movable element of the sensor. The pressure changes then result in movement of that element and translation of that movement into indications of fluid flowrate.

In light of the foregoing teaching, it is apparent that numerous other arrangements may be devised by those skilled in the art without departing from the spirit and scope of my invention.

What is claimed is:

1. In combination,
    means for generating staggered trails of vortices in a fluid flow streamwise in a conduit and
    a thin plate mounted a prescribed distance downstream from said generating means for maintaining said staggered trails of vortices in separation and said plate having upper and lower surfaces defining a site in said conduit for sensing staggered and separated trails of said vortices,
    said conduit comprising means defining an inner wall,
    said generating means comprising a bluff body having a first surface including a prescribed height dimension and having second surfaces extending streamwise from said first surface toward said plate, and
    said plate comprising a frontmost surface mounted downstream from said second surfaces at a distance substantially two to three times the height dimension of said first surface.

2. The combination in accordance with claim 1 wherein
    said plate comprises a flat plate mounted in a same plane as the streamwise plane of said bluff body and substantially normal to said first surface of said bluff body, a thin dimension of said plate lying in a plane substantially parallel to said streamwise direction of flow through said conduit, and said upper and lower surfaces having a streamwise length for enabling a fluid flow vortex signal to occur one at a time on opposite portions of said upper and lower plate surfaces.

3. The combination in accordance with claim 2 wherein said plate comprises opposite end segments rigidly secured to said inner conduit wall, said thin dimension of said plate being of a predetermined thickness so that said upper and lower plate surfaces between said rigidly secured opposite ends are movable in directions arcuately normal to said streamwise fluid flow and in response to pressure differentials produced on said upper and lower surfaces by said staggered and separated fluid flow vortex signals, and said combination further comprising a motion sensitive sensor means mounted for detecting movement of said plate surfaces.

4. The combination in accordance with claim 3 wherein at least one of said movable plate surfaces comprises a ferromagnetic material, and said motion sensitive sensor means comprises an electromagnetic sensor means.

5. The combination in accordance with claim 4 wherein said at least one of said movable plate surfaces comprises a flexible nonmagnetic material, said ferromagnetic material is attached to said nonmagnetic material, said ferromagnetic and nonmagnetic materials being deflectably movable in response to said staggered and separated vortex fluid flow streamwise past said plate, and said electromagnetic sensor means generating a magnetic field altered by a movement of said ferromagnetic material for producing output signals related to fluid flowrate through said conduit.

6. The combination in accordance with claim 5 wherein said upper and lower plate surfaces comprise a middle section between said opposite plate ends rigidly secured to said inner conduit wall, and said ferromagnetic and nonmagnetic materials are mounted proximate to said middle section of said upper and lower plate surfaces.

7. The combination in accordance with claim 3 further comprising a pair of rod extension members each of which is secured at one end thereof to an individual one of said upper and lower plate surfaces, and wherein said motion sensitive means comprises a pair of sensors for detecting movement of said extension members in response to movement of said upper and lower plate surfaces.

8. The combination in accordance with claim 7 wherein said upper and lower surfaces each comprise a middle section between said rigidly secured opposite plate end segments, and each of said rod extension is secured at one end thereof to an individual one of said upper and lower surfaces at said middle section.

9. The combination in accordance with claim 2 wherein said inner conduit wall comprises means defining a pair of slotted cavities on opposite diameter ends of said inner wall, and said plate has opposite end segments slidably fastened within said slotted cavities.

10. The combination in accordance with claim 2 further comprising a pair of support members fastened at opposite diameter ends of said inner conduit wall and each of said support members having means defining a slotted cavity, and wherein said plate has opposite end segments slidably fastened within the slotted cavities of said support members.

11. The combination in accordance with claim 2 wherein said plate comprises a first end rigidly secured to said inner conduit wall and a second end being free to move pivotally about said first plate end in directions arcuately normal to said streamwise fluid flow.

12. The combination in accordance with claim 11 wherein said second plate end comprises a ferromagnetic material and said motion sensitive sensor means comprises an electromagnetic sensor means for sensing movement of said ferromagnetic material in response to said staggered and separated vortex signals and to produce indications of flowrate through said conduit.

13. The combination in accordance with claim 12 wherein at least one of said movable plate surfaces comprises a flexible nonmagnetic material secured thereto, said ferromagnetic material being secured to said nonmagnetic material, said ferromagnetic and nonmagnetic materials being deflectably movable in response to said staggered and separated vortex fluid flow streamwise past said plate, and said electromagnetic sensor means generating a magnetic field altered by a movement of said ferromagnetic material for producing output signals related to flowrate through said conduit.

14. The combination in accordance with claim 12 wherein said ferromagnetic material comprises a spherically shaped body, and further comprising a device secured to said inner plate wall and having means defining a cavity in which said spherically shaped body extends and said cavity confining the movement of said spherically shaped body in response to staggered and separated vortex fluid flow past said plate, and wherein said electromagnetic sensor means extends into said conduit in nonfluid communication with fluid flow in said conduit for sensing said movement of said spherically shaped body.

15. The combination in accordance with claim 14 wherein said upper and lower plate surfaces are spring shaped in a direction between said end segment rigidly secured to said inner conduit wall and said free to move plate end segment.

16. The combination in accordance with claim 1 wherein said plate comprises means defining an aperture between said upper and lower plate surfaces, and said combination further comprising a motion sensitive sensor means extending into said aperture for sensing staggered and separated fluid flow vortices communicated to said aperture from the environment of said upper and lower plate surfaces.

17. The combination in accordance with claim 16 wherein said motion sensitive sensor means comprises a thermal sensor, and said plate comprises a central bore for admitting said thermal sensor into said plate aperture for sensing said staggered and separated fluid flow vortices.

18. The combination in accordance with claim 1 further comprising a shuttle mass unit integrally formed in an upstream portion of said plate and including an inner elongated cylindrical chamber and a pair of relatively smaller channels extending therefrom to communicate with fluid flow vortices at said upper and lower surfaces, a mass member situated in said chamber movable in a direction transverse to the streamwise flow through said conduit and in response to vortex flow signals communicated to said channels, and means responsive to the movement of said member for producing an output signal related to the fluid flowrate through said conduit.

19. The combination in accordance with claim 18 wherein said pair of channels comprises a first and a second channel which are offset from each other and are located at opposite ends of said cylindrical chamber, said mass member comprises a circular magnetic element and said producing means comprises an electromagnetic sensor means in nonfluid communication with said fluid flow through said conduit for sensing movement of said element.

20. The combination in accordance with claim 1 further comprising hinge means pivotally secured to said inner conduit wall, and wherein said plate comprises a first end pivotally secured to said hinge means and a second end being free to move pivotally about said hinge means for movement in directions arcuately normal to the streamwise direction of flow through said conduit.

21. The combination in accordance with claim 20 further comprising a pair of rod extension members each of which is secured at one end thereof to an individual one of said upper and lower plate surfaces, and wherein said motion sensitive means comprises a pair of sensors for detecting movement of said extension members in response to movement of said upper and lower plate surfaces.

22. The combination in accordance with claim 20 wherein at least one of said upper and lower plate surfaces comprises a ferromagnetic material at its free to move plate end and said motion sensitive sensor means comprises an electromagnetic sensor means for sensing movement of said ferromagnetic material in response to said staggered and separated vortex fluid flow past said plate and to produce indications related to flowrate through said conduit.

23. The combination in accordance with claim 1 wherein said plate means comprises upper and lower surfaces, means defining at least one aperture extending between said upper and lower surfaces, a capacitor sensing unit having a capacitance fluid and upper and lower means enclosing said fluid about said upper and lower surfaces of said thin plate, and said upper and lower means being moveable and urging the enclosed fluid to move through said at least one aperture in response to said staggered and separated trails of said vortices for producing signals related to fluid flowrate through said conduit.

24. Apparatus for use in measuring the flowrate of fluid in a conduit with a bluff body having a base surface disposed substantially normal to the streamwise direction of fluid flow, said surface extending along a diameter of said conduit and between the walls thereof, a pair of downstream surfaces extending downstream from said base surface and meeting said base surface along a pair of edges, said base and downstream surfaces being mutually adapted so that the boundary layers of said fluid separate from said body at said edges, and the ratio of the axial length of said body to the height dimension of said base surface being between 1 and 2 and the ratio of the height dimension of said base surface to the inner diameter of said conduit transverse to the longitudinal axis thereof being between 0.15 and 0.4, said apparatus comprising a thin plate fixedly mounted entirely within said conduit and for stationary nonmovement in a streamwise direction and downstream from said downstream surfaces at a distance substantially two to three times the height dimension of said base surface, said plate having first and second surfaces for maintaining staggered trails of fluid flow vortices in separation in their flow downstream from said edges and past said plate surfaces and to define a site for sensing staggered and separated trails of said vortices.

25. Apparatus according to claim 24 wherein said thin plate spans said inner diameter between said conduit walls, a thin dimension of said plate being in a plane parallel to the streamwise direction of flow through said conduit, and said first and second surfaces having a streamwise length for enabling a fluid flow vortex signal to occur one at a time on said first and second plate surfaces.

26. Apparatus according to claim 25 wherein said streamwise length of said first and second surfaces is between at least 0.5 to 3 times the height dimension of said base surface.

27. Apparatus according to claim 25 wherein said plate comprises opposite end segments rigidly secured to the inner conduit wall, said thin dimension of said plate being of a prescribed thickness so that said first and second plate surfaces between said rigidly secured opposite plate ends are movable in directions normal to said streamwise fluid flow and in response to pressure differentials produced on said first and second plate surfaces by said staggered and separated fluid flow vortex signals.

28. Apparatus according to claim 27 further comprising a motion sensitive arrangement communicating with said plate for detecting movement of said first and second plate surfaces.

29. Apparatus according to claim 25 wherein
said plate comprises a first end rigidly secured to said inner wall of said conduit and a second end being free to move pivotally about said first plate end in a direction arcuately normal to said streamwise fluid flow through said conduit and in response to staggered and separated vortex signals, and further comprising
means cooperating with the movement of said second plate end for producing signals related to the flowrate through said conduit.

30. In combination,
means for generating staggered trails of vortices in a fluid flow streamwise in a conduit,
a thin plate fixedly mountable a prescribed distance downstream from said generating means for maintaining said staggered trails of vortices in separation and said plate having upper and lower surfaces and means defining at least one aperture extending between said upper and lower surfaces, and
a capacitor sensing unit having
a capacitance fluid and
upper and lower plate means enclosing said fluid adjacent said upper and lower surface of said thin plate,
said upper and lower plate means and said thin plate defining a site in said fluid for sensing staggered and separated trails of said vortices and
said upper and lower plate means being movable and urging the enclosed fluid to move through said at least one aperture in response to said trails of said vortices for producing signals related to flowrate through said conduit.

* * * * *